United States Patent [19]

Katz et al.

[11] 4,218,958
[45] Aug. 26, 1980

[54] SERVO-STEERING SYSTEM FOR VEHICLES

[75] Inventors: Klaus Katz; Reinhold Abt, both of Stuttgart; Jaromir Bordovsky, Berglen; Wolfgang Pfundstein, Stuttgart; Georg Wingert, Böblingen, all of Fed. Rep. of Germany

[73] Assignee: Daimler-Benz Aktiengesellschaft, Fed. Rep. of Germany

[21] Appl. No.: 885,188

[22] Filed: Mar. 10, 1978

[30] Foreign Application Priority Data

Mar. 12, 1977 [DE] Fed. Rep. of Germany ....... 2710849

[51] Int. Cl.$^2$ .......................... F15B 13/14; F01B 31/00
[52] U.S. Cl. .......................................... 91/434; 91/372; 92/130 D
[58] Field of Search ................. 91/372, 373, 371, 370, 91/434, 433; 92/130 D

[56] References Cited

U.S. PATENT DOCUMENTS

| | | | |
|---|---|---|---|
| 2,985,145 | 5/1961 | Foerster et al. | 91/373 |
| 3,444,786 | 5/1969 | Förster et al. | 91/434 |
| 3,719,124 | 3/1973 | Katz et al. | 91/434 |
| 4,003,404 | 1/1977 | Burckhardt | 91/433 |

Primary Examiner—Paul E. Maslousky
Attorney, Agent, or Firm—Craig & Antonelli

[57] ABSTRACT

A servo-steering mechanism for vehicles with a feedback of a load-dependent reaction moment onto the steering hand wheel by means of at least one reaction pressure cylinder connected with a working pressure chamber, in which a reaction pressure piston operating onto the steering hand wheel is adapted to be actuated in one direction of its piston axis by the working pressure and in the other direction of its piston axis is adapted to be supported at a support spring and is also adapted to come into abutment at a stop fixed relative to the reaction pressure cylinder, when the working pressure has been brought to a value corresponding to the prestress of the support spring; between its starting position with an unstressed support spring and its shut-off or turn-off position at the associated stop the reaction pressure piston thereby comes into additional abutment at least at one reducing spring counteracting the working pressure, whereby the reducing spring is adapted to be supported either directly or by way of at least one further reducing spring at a counter abutment of the reaction pressure cylinder.

20 Claims, 15 Drawing Figures

SERVO-STEERING SYSTEM FOR VEHICLES

The present invention relates to a servo-steering mechanism for vehicles with a feedback of a load-dependent reaction moment onto the steering wheel by means of at least one reaction pressure cylinder connected to a working pressure chamber of the servo motor, in which a reaction pressure piston operating onto the steering wheel is adapted to be actuated in one direction of its piston axis by the working pressure and in the other direction of its piston axis is adapted to be supported at a support spring and comes into abutment at a stop fixed relative to the reaction pressure cylinder, when the working pressure has been brought to a value corresponding to the prestress of the support spring.

Such a servo-steering system provides for the driver a good contact to the road respectively a good feel for the steering moments introduced from the road onto the steering shaft notwithstanding the servo-assist. The reaction moment supplied by working pressure is not turned-off or shut-off in its effect on the steering wheel; i.e., rendered inoperable when the pressure force of the reaction pressure piston overcomes the prestress of its support spring and as a result thereof the reaction pressure piston is brought into abutment at the stop or abutment on the side of the cylinder. Only the relative flat spring characteristic of the support spring then is effective in the further development of the manual force over the increasing working pressure. It is avoided in this manner that the manual force assumes undesirably high values with higher steering shaft moments—especially therefore during parking. Since, however, one reaction pressure piston alone is able to provide only a linear characteristic for the manual force development by reason of its constant effective pressure area, its reaction moment is relatively weak at smaller and middle working pressures. As a result thereof the danger exists that the driver during these operating conditions—i.e., for example, during curve drives—tears the steering by reason of a lacking reaction. In order to counteract this danger, it is known to coordinate to the respective steering deflection at least one additional reaction pressure piston which in conjunction with an abutment or stop on the side of the cylinder and with a separate support spring operates exclusively at smaller and medium working pressures. It is possible in this manner to impart to the manual force curve up to the middle working pressures a relatively steep characteristic—and beginning with middle working pressures a relatively flat characteristic up to the range of the manual force limitation.

Servo-steering mechanisms with reaction pressure pistons connected with a working pressure chamber of the servo-motor and of different operating ranges are known in the art. In the servo-steering mechanism of the German Offenlegungsschrift No. 2,009,574, the reaction pressure cylinder is provided in the valve-adjusting member of the control valve adjusting the working pressure for accommodating two reaction pressure pistons of different working ranges. The associated support springs are then effectively arranged between the respective reaction pressure piston and the housing. It is also known from the British Pat. No. 781,980 to provide reaction pressure cylinders in the housing of the control valve adjusting the working pressure. The support springs of the associated reaction pressure pistons are then effectively arranged between reaction pressure pistons and valve-adjusting member of the control valve.

Since the manufacture especially of the cylinderical fitting surfaces at reaction pressure cylinders and reaction pressure pistons is expensive, additional reaction pressure pistons for achieving the desired, steeper increase of the manual force up to the middle working pressures are not always desired.

The task underlying the present invention therefore also consists in imparting a relatively steep characteristic onto the curve of the manual force as a function of the working pressure up to the middle working pressures and therebeyond a relatively flat characteristic up to the range of the manual force limitation. However, the expenditures in reaction pressure pistons are to be kept thereby as small as possible.

Starting with a servo-steering system of the type described hereinabove, the underlying problems are solved in an advantageous manner according to the present invention in that the reaction pressure piston is additionally supported between its starting position with an unstressed support spring and its turn-off or shut-off position at the respective abutment of its reaction pressure cylinder, at least at one reducing spring counteracting the working pressure which is adapted to be supported directly or at least by way of a further reducing spring causing the reaction pressure piston to be supported at a counter abutment of the reaction pressure cylinder.

In the servo-steering system according to the present invention, the stroke of the reaction pressure piston with respect to its reaction pressure cylinder is adapted to be subdivided into two or several sections by one or several reducing springs which become effective stepwise. The steeper the spring characteristic of the reducing spring, the flatter extends the associated section of the manual force curve and vice versa. It thus becomes possible by the present invention to achieve the desired configuration of the manual force curve by means of a single reaction pressure piston which operates over the entire pressure range between working pressures approaching zero and the limit pressure for the manual force limitation. An additional reaction pressure piston for achieving the steeper configuration of the manual force curve between zero and middle working pressures is no longer required.

For purposes of achieving a pronounced belly contour of the manual force curve within the range of smaller and middle working pressures, it is advantageous in the servo-steering mechanism according to the present invention if the reducing spring has a progressive characteristic. It is frequently possible with a progressive spring characteristic to be able to get along with a single reducing spring.

For space reasons, conical reducing springs with progressive characteristic are difficult to accommodate in the control valve for the working pressure. Consequently, it is advantageous in the servo-steering mechanism according to the present invention that the reducing spring is cylindrical and has a variable pitch in such a manner that during inward spring deflection, more than one spring winding are stressed synchronously into mutual abutment to form a solid block.

If in the servo-steering mechanism according to the present invention one constructs the reducing spring in such a manner that the pitch is symmetrical to the center plane of the reducing spring perpendicular to the spring axis, then the winding or coiling operation of the spring is simplified.

In order to be able to control the winding or coiling of the cylindrical reducing spring with varying pitch in the usual manner by way of a jerk-free or jolt-free cam, it is advantageous in the servo-steering mechanism according to the present invention that the pitch of the reducing spring is a sine or cosine function of the winding angle.

In order to obtain a jolt-free cam curve also for the winding of the abutting spring ends, it is advantageous in the servo-steering mechanism according to the present invention that the beginning of the first spring winding or coil starting from a spring end of the reducing spring lies within the minimum of the pitch function.

Accordingly, it is an object of the present invention to provide a servo-steering system for motor vehicles with feedback of a load-dependent reaction moment to the steering wheel which eliminates by simple and highly effective means the aforementioned shortcomings and drawbacks encountered in the prior art.

Another object of the present invention resides in a servo-steering mechanism of the type described above which is simple in construction, utilizes a minimum of parts and is highly effective to provide a good road feel.

A further object of the present invention resides in a servo-steering mechanism in which the reaction moment is fairly pronounced even at smaller and medium working pressures, notwithstanding the use of a simple construction utilizing few parts.

Still a further object of the present invention resides in a servo-steering mechanism in which a smooth steering action is assured under all driving conditions as a result of an appropriate reaction moment noticeable at the steering wheel.

Still another object of the present invention resides in a servo-steering mechanism of the type described above which permits a relatively inexpensive manufacture of its various parts with undiminished high quality of the road feel.

A further object of the present invention resides in a servo-steering mechanism in which a relatively steep characteristic is imparted to the manual force development as a function of working pressure up to middle working pressures while a relatively flat characteristic is imparted thereto up to the range of the manual force limitation without the need of complicated structures.

Another object of the present invention resides in a servo-steering mechanism in which the stroke of a reaction pressure piston is adapted to be subdivided by simple structural means into two or more sections with respect to the reaction pressure cylinder by the use of one or several reducing springs that become operable stepwise.

A further object of the present invention resides in a servo-steering mechanism of the type described above in which a single reaction pressure piston suffices to achieve the desired configuration of the manual force curve over the entire pressure range between working pressures approaching zero and the limit pressure for the manual force limitation.

Another object of the present invention resides in a servo-steering mechanism which permits the use of springs that can be readily installed within a relatively small space, yet can also be readily manufactured by conventional means.

These and other objects, features and advantages of the present invention will become more apparent from the following description when taken in connection with the accompanying drawing which shows, for purposes of illustration only, several embodiments in accordance with the present invention, and wherein:

FIG. 1 is a somewhat schematic view of a first embodiment of a servo-steering mechanism according to the present invention, in which an axial cross section 1a through the servo-steering mechanism generally designated by reference numeral 41 is operatively connected by symbolically illustrated hydraulic lines with a cross section 1b through the servo-steering mechanism in accordance with the present invention taken along line b—b of the axial cross section 1a;

FIG. 7 is a diagram of the manual force curve for the right deflection of the of the servo-steering mechanism of FIG. 6;

Figure 1:
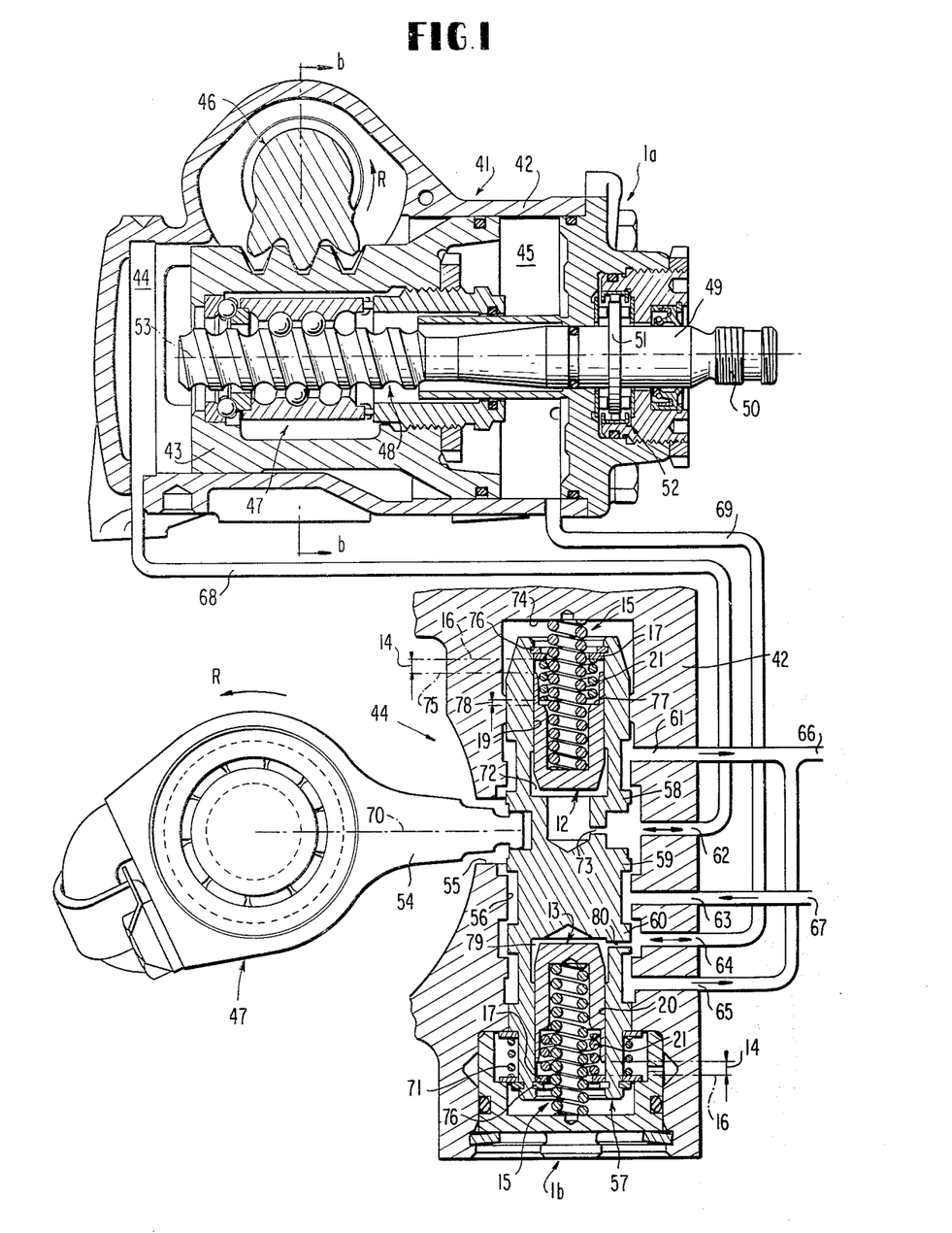
Figure 2:
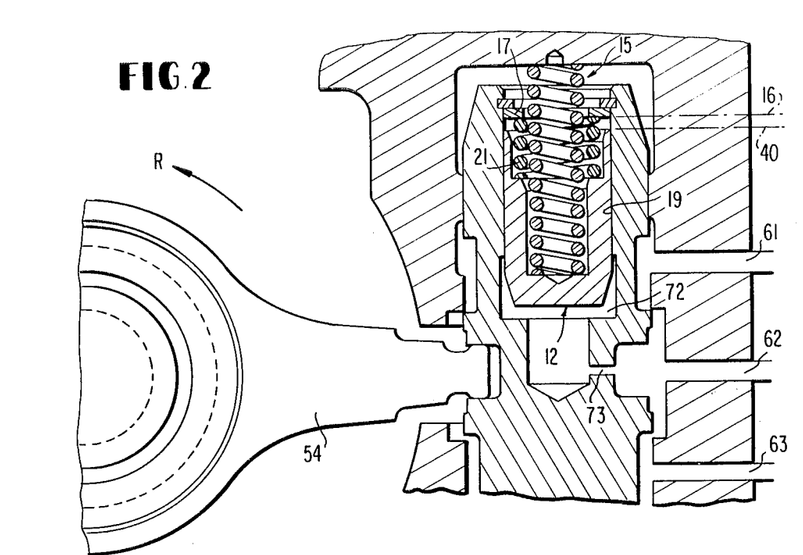
FIG. 2 is a partial cross-sectional view of the servo-steering mechanism according to the present invention in its working position during a right deflection, the cross section corresponding to the cross section 1b of FIG. 1.
Figure 3:
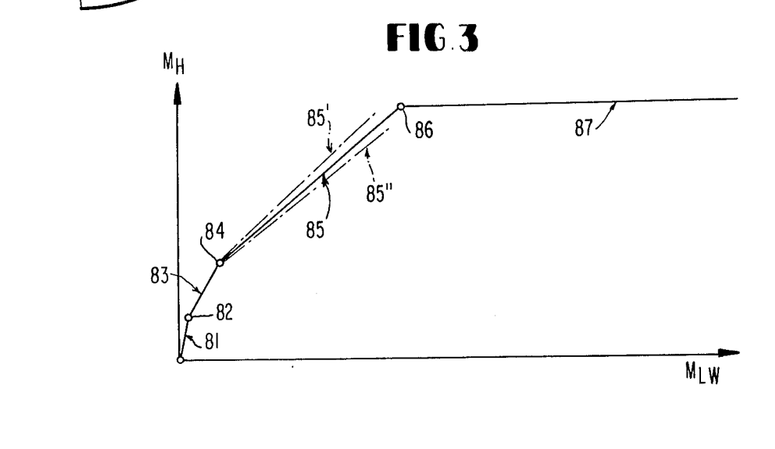
FIG. 3 is a diagram for the manual force curve during the right deflection of the first embodiment of FIGS. 1 and 2.

Referring now to the drawing wherein like reference numerals are used throughout the various views to designate like parts, and more particularly to the first embodiment of FIGS. 1 to 3, a housing 42 of the servo-steering mechanism generally designated by reference numeral 41, constructed as pressure medium cylinder and accommodating the steering gear, is subdivided by a working piston 43 into a working pressure chamber 44 for the right deflection of the steering wheel and into a working pressure chamber 45 for the left deflection thereof. A steering nut generally designated by reference numeral 47 is rotatably and axially essentially immovably supported in the working piston 43 which is in driving connection with a steering shaft 46 by way of a toothed rack profile and a corresponding toothed segment. The steering nut 47 is helically connected with a steering worm generally designated by reference numeral 48 which has a steering spindle part 49 that is coaxial and non-rotatable with respect thereto. The steering spindle part 49 which is adapted to be coupled in non-rotatable drive connection with the steering hand wheel by way of a coupling pin 50 disposed on the outside of the housing, is rotatably and non-displaceably supported in the direction of its axis 53 within the housing 42 by means of a bearing collar 51 by way of a roller bearing arrangement generally designated by reference numeral 52. The steering nut 47 is provided with a control arm 54 non-rotatable with respect thereto which extends through a slot-like connecting opening 55 between the working pressure chamber 44 and a housing bore 56 for a control slide valve member generally designated by reference numeral 57 for the adjustment of the working pressure. The control slide valve member 57 is provided with three spool-like control sections 58, 59 and 60 for the control of five valve connections 61, 62, 63, 64 and 65. The two outer valve connections 61 and 65 are connected with an essentially pressure-relieved return line 66 which leads, in a manner not illustrated in detail, to a reservoir tank (not shown) for the pressure medium. A pressure pump (not shown) sucks in pressure medium out of the reservoir tank and continuously feeds a pressure medium quantity that is constant with respect to time by way of a feed line 67 to the valve connection 63. Whereas the valve connection 62 is in communication by way of a housing channel illustrated as pressure line 68 with the working pressure chamber 44 for the right-hand deflection, the valve connection 64 is operatively connected by way of a housing channel illustrated as pressure line 69 with the working pressure chamber 45 for the left hand deflection.

In the neutral position 70 of the control arm 54 and of the control slide valve member 57 illustrated in the cross section generally designated by the reference character 1b of FIG. 1, which is maintained with a non-actuated steering by a centering spring 71 supported at the control slide valve member 57 and at the housing 42, the pressure medium which flows toward the valve connection 63, flows back essentially unthrottled by way of the valve connections 61 and 65 and the return line 66 to the reservoir tank. With a right-hand deflection of the steering wheel, the control arm 54 is deflected out of the illustrated neutral position 70 in the direction of arrow R, as a result of which the valve connection 62 of the working pressure chamber 44 is more or less connected with the valve connection 63 of the pressure pump and the valve connection 64 of the other working pressure chamber 45 is more or less connected with the valve connection 65 of the reservoir tank. In this manner, a higher pressure is established in the working pressure chamber 44 than in the working pressure chamber 45. The differential pressure force resulting therefrom at the working piston 43 assists the actuation of the steering shaft 46 in the direction of rotation of the arrow R in the axial cross section generally designated by the reference character 1a for the right hand deflection.

During the left deflection of the steering hand wheel, an opposite deflection of the control arm 54 and of the control slide valve 57 takes place, as a result of which a higher pressure is established in a corresponding manner in the working pressure chamber 45 than in the working pressure chamber 44 so that the differential pressure force which results at the working pressure 43 is directed oppositely.

The control slide valve member 57 is provided at its housing inner end with a dead-end bore 19 serving as a reaction pressure cylinder, in which a reaction pressure piston generally designated by reference numeral 12 operating during a right-hand deflection is displaceably accommodated. A reaction pressure chamber 72 of the reaction pressure cylinder 19 which is closed off by the reaction pressure piston 12 is in constant communication with the valve connection 62 of the working pressure chamber 44 by way of a bore 73 of the control slide valve member 57. On its side opposite the reaction pressure chamber 72, the reaction pressure piston 12 is supported at a support spring generally designated by reference numeral 15 which in its turn is supported at a fixed counter abutment surface 74 of the housing 42. If the reaction pressure piston 12 is in its starting position 75 illustrated in the cross section 1b, it abuts at the support spring 15. In the starting position 75, the reaction pressure piston 12 has a free piston stroke 14 with respect to a spring ring plate 17, which is fixed in the control slide valve member 57 by a retaining ring 76 supporting the spring ring plate 17. The retaining ring 76 is inserted into a circumferential groove of the reaction pressure cylinder 19. The spring ring plate 17 serves for the support of a reducing spring 21 concentrically cylindrically surrounding the support spring 15 at the control slide valve member 57. The free end of the centering spring 71 which is opposite the spring ring plate 17 permits a free piston stroke 78 with respect to a corresponding abutment edge 77 of the reaction pressure piston 12.

For the left hand deflection of the steering wheel, a corresponding arrangement for a reaction pressure piston generally designated by reference numeral 13 is provided at the opposite end of the control slide valve member 57 which is inserted into a dead-end bore of the control slide valve member serving as reaction pressure cylinder 20. A reaction pressure chamber 79 of the reaction pressure cylinder 20 which is closed off by the reaction pressure piston 13, is in constant communication with the valve connection 64 of the other working pressure chamber 45 for the left-hand deflection by way of a bore 80. In a corresponding manner as the reaction pressure piston 12 for the right-hand deflection, the reaction pressure piston 13 for the left-hand deflection is adapted to be supported at a support spring 15, which cooperates with the housing 42 as counter abutment. Furthermore, the reaction pressure piston 13 is adapted to be supported after a corresponding free piston stroke at a reducing spring 21, whose counter abutment is formed by a spring ring plate 17 that is supported at the control slide valve member 57 by way of a retaining ring 76.

The operation of the reaction pressure pistons will be described hereinafter by reference to the reaction pressure piston 12 operating during a right-hand deflection by reference to FIGS. 1 to 3.

In the diagram of FIG. 3, the steering manual moment $M_H$ which is noticeable at the steering wheel is plotted as a function of the external steering shaft moment $M_{LW}$. At very small steering wheel deflections, the control arm 54 and the control slide valve member 57 remain at first in the neutral position 70 as a result of the effect of the centering spring 71. This means, the steering nut 47 is non-rotatably fixed with respect to the housing 42. By reason of this neutral position of the control slide valve member 57, a servo-assist is not being built-up, and the steering shaft 46 is actuated purely mechanically by way of the steering worm 48 and the steering hand wheel. The curve of the manual steering moment in this purely mechanical working range of the servo-mechanism is illustrated by the curve section 81 in FIG. 3. With an increasing steering wheel deflection, the prestress force of the centering spring 71 is overcome (point 82 in FIG. 3) so that the control slide valve member 57 establishes a higher pressure in the working pressure chamber 44 and the reaction pressure chamber 72 is under the working pressure of this working pressure chamber 44. The reaction pressure force at the control slide valve member 57, which results from the housing support of the reaction pressure piston 12, is directed opposite to the direction R of deflection in the cross section 1b and is thus noticeable as a manual steering moment. The development of the manual steering moment in this proportional operating range of the servo-steering mechanism which is non-reduced in relation to the effective piston area is illustrated by the curve section 83 in FIG. 3. In the curve point 84 in FIG. 3, the reaction pressure piston 12 is supported with its abutment edge 77 at the reducing spring 21 under compression of the support spring 15. Since at this instant the stress of the reducing spring 21 counteracts the housing support of the reaction pressure piston 12, the reaction pressure force at the control slide valve member 57 is reduced by the spring force of the reducing spring 21. Consequently, a reduced proportional working range of the servo-steering mechanism adjoins which is illustrated in FIG. 3 by the curve section 85. In the curve point 86 of FIG. 3, the piston stroke 14 of the reaction pressure piston 12 has become zero, as a result of which the latter is rigidly supported at the control slide valve member 57 by way of the retaining ring 76 and therewith is effectively eliminated or rendered inoperable in its pressure effect on the control slide valve member 57. With a further increase of the steering wheel deflection and therewith of the working pressure in the reaction pressure chamber 72, only the very flat spring characteristic of the support spring 15 is effective in the curve configuration of the manual steering moment $M_H$ (curve section 87 in FIG. 3 for the range of the manual force limitation).

In the working position of the servo-steering mechanism illustrated in FIG. 2, the reaction pressure piston 12 is within the range of the curve section 85 of FIG. 3, as can be recognized from the spring-deflected reducing spring 21.

Finally, it can also be seen from FIG. 3 that with a weak reducing spring 21, a steeper configuration 85' can be achieved whereas with a stronger reducing spring, a flatter configuration 85" of the curve section 85 of FIG. 3 can be attained.

Furthermore, it is indicated by the rectilinear portion of the curve section 85 in FIG. 3 that the reducing spring 21 involves a cylindrical spring with a linear spring characteristic.

The second embodiment of the servo-steering mechanism according to the present invention illustrated in FIGS. 4a, 4b, 4c, 5, and 8 to 11 differs from the first embodiment exclusively by the progressive spring characteristic of its reducing spring 22.

Figure 10:
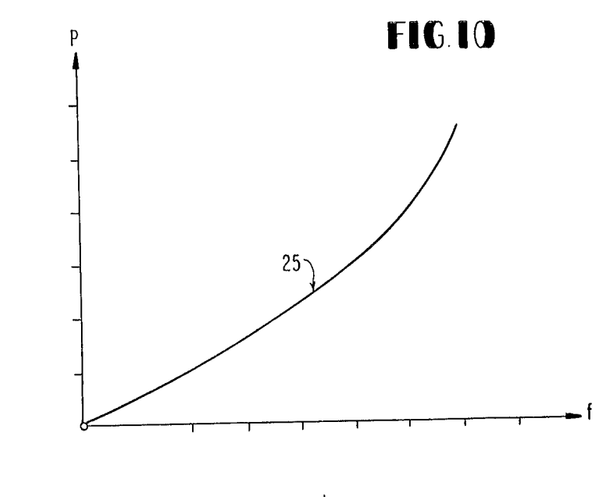
FIG. 10 is a diagram for the spring characteristics of the reducing spring of FIG. 8.
Figure 11:
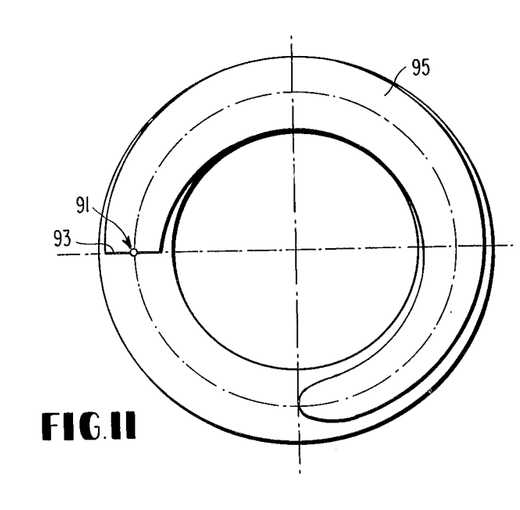
FIG. 11 is an end elevational view of the reducing spring taken in the direction of arrow XI in FIG. 8 for the servo-steering mechanism in accordance with the present invention.

The progressive curve of the spring characteristic 25 of the reducing spring 22 is illustrated in the diagram of FIG. 10, in which the spring force P is plotted against the spring path f. The progressivity was achieved in that the spring coils of the cylindrical reducing spring 22 are wound with a non-linear pitch S. In this manner, not all of the spring coils are stressed at the same time into mutual abutment to form a solid block during the inward spring movement but, depending on the pitch curve, one or several spring coils are stressed sequentially with respect to time into mutual abutment to form a block and thus are disconnected from the spring work.

Figure 9:
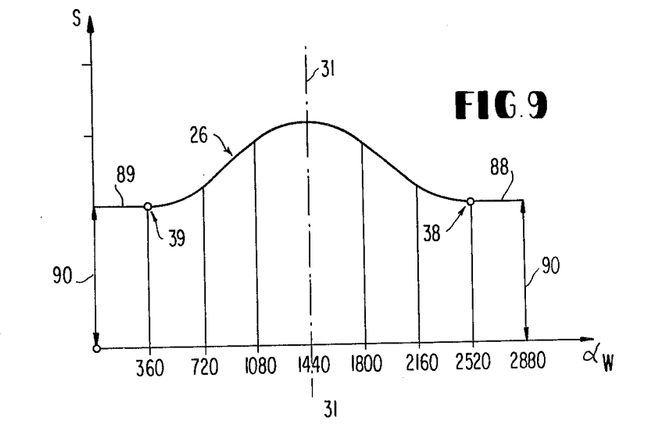
FIG. 9 is a diagram for the pitch of the reducing spring of FIG. 8.

The pitch S for the reducing spring 22 is plotted in FIG. 9 as a function of the winding angle $a_W$. The ordinate distance 90 of the pitch curve 26 corresponds to the wire diameter of the reducing spring 22. As can be seen from FIGS. 8 and 9, the pitch configuration 26 is symmetrical to the center plane 31—31 of the reducing spring 22 perpendicular to the spring axis. Three coil pairs generally designated by the reference numerals 36, 37 and 27, 28 as well as 29, 30 of individual windings or coils are thereby symmetrically arranged on both sides of the center plane 31—31. At its ends 34 and 35, the reducing spring 22 terminates in the usual manner in a three-quarter winding 95 and 96, respectively. At the terminal edge 93 and 94 of the respective three-quarter winding 95 and 96 is located the support point generally designated by the reference numerals 91 and 92 of the first spring winding or coil 36 and 37 starting from the spring end. As a result thereof, the respective starting cross section which is supported at the end edge 93 and 94 and is indicated at 32 and 33, forms the respective start of the first spring winding or coil 36 and 37, respectively. In order to be able to use a jolt-free cam for the control of the winding coiling operation, the pitch curve 26 is a sine or cosine function of the winding angle $a_W$. One starting cross section 32 and 33 each of the first spring windings 36 and 37 are placed at the two minima 38 and 39 of this sine or cosine function which minima are located symmetrically to the center plane 31—31. The two end sections 88 and 89 of the pitch curve 26 which extend parallel to the abscissa at a distance 90, correspond to a winding angle of 360° and belong to the respective non-spring winding or coil 95 and 96.

Figure 4A:
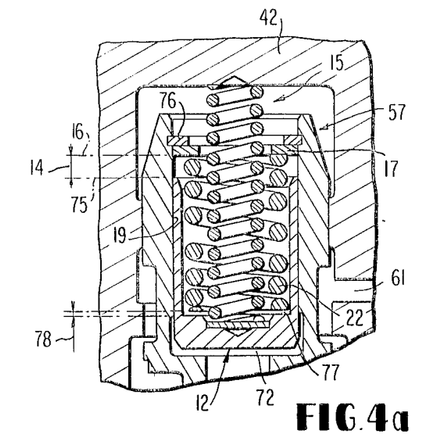
FIGS. 4a, 4b, and 4c are partial cross-sectional views through the reaction pressure piston for the right deflection of a second embodiment of a servo-steering mechanism according to the present invention, illustrating the same in three different positions.
Figure 4B:
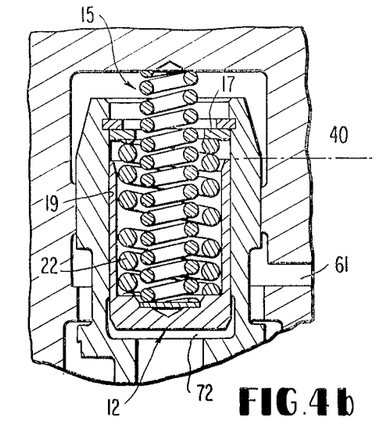
Figure 4C:
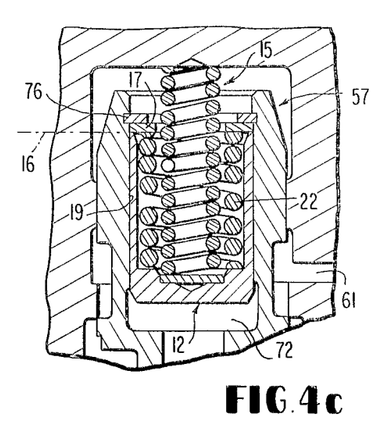

One working position each of the reaction pressure piston 12 for the right-hand deflection is illustrated in the cross sectional views of FIGS. 4a, 4b and 4c. The curve resulting therefrom of the hand steering moment $M_H$ as a function of steering shaft moment $M_{LW}$ can be seen from FIG. 5.

Figure 5:
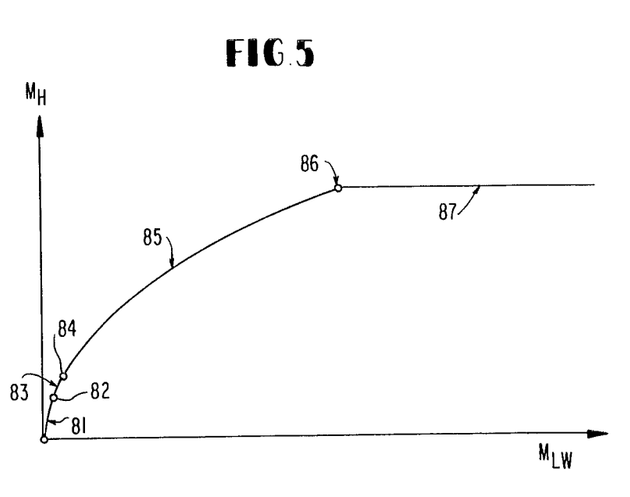
FIG. 5 is a diagram of the manual force curve during the right deflection of the second embodiment of FIGS. 4a-14c.

The reaction pressure piston 12 illustrated in FIG. 4a, in its starting position 75 with respect to the spring ring plates 17, is supported at the retaining ring 76. In this starting position 75, the reaction pressure piston 12 has a free piston stroke 14 with respect to the spring ring plate 17 and a free piston stroke 78 with respect to the reducing spring 22. The control slide valve member 57 is again retained in its neutral position 70 within the mechanical working range 81 by the centering spring 71 (FIG. 1), until the prestress of the centering spring 71 in FIG. 5 is overcome by the control arm 54 (FIG. 1). Under the working pressure controllingly established in the reaction pressure chamber 72, the reaction pressure piston 12 abuts at the reducing spring 22 under compression of the support spring 15, as is illustrated by the piston position 40 in the FIG. 4b. This functioning transition is illustrated in FIG. 5 by the curve point 84. With a further increase of the working pressure in the reaction pressure chamber 72, the stress of the reducing spring 22 supported at the spring ring plate 17 now operates opposite the working pressure, from which results the degressive configuration of the curve section 85 in FIG. 5. Finally, with a further increasing working pressure in the reaction pressure chamber 72, the reaction pressure piston 12 reaches its disconnect or shut-off position 16 shown in FIG. 4c, in which it is rigidly supported at the control slide valve member 57 by way of the spring ring plate 17 and the retaining ring 76. As a result thereof, its reaction pressure effect on the steering hand wheel is rendered inoperable, i.e., turned-off, and only the spring characteristic of the support spring 15 is effective in the further curve configuration 87 in FIG. 5. The last-mentioned functioning transition is indicated in FIG. 5 by the curve point 86.

The the servo-steering mechanism according to the present invention illustrated in FIGS. 6a, 6b, 6c, and 7 differs from the first embodiment by the arrangement of two series-connected reducing springs 23 and 24. As to the remaining features, both embodiments are identical. In FIG. 6, the reaction pressure piston 12 for the right-hand deflection is illustrated in three different working positions by means of three cross sectional views of FIGS. 6a, 6b and 6c. The curve of the hand steering moment plotted as a function of the steering shaft moment in the third embodiment is illustrated in FIG. 7.

Figure 6:
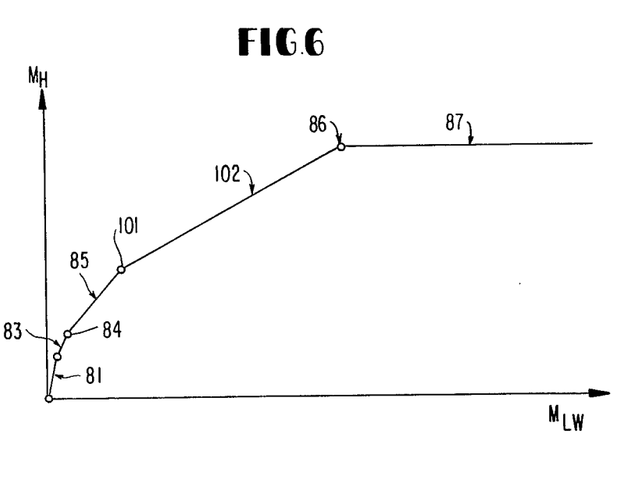
FIGS. 6a, 6b, and 6c are partial cross-sectional views of the reaction pressure piston with a right deflection of a a servo-steering mechanism in accordance with the present invention, again illustrating the reaction pressure piston in three different operating positions.
Figure 6A:
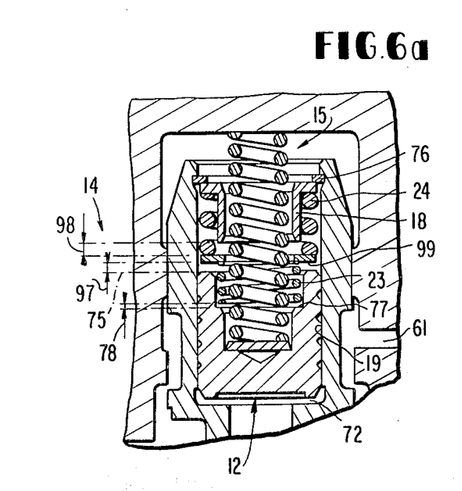
Figure 6B:
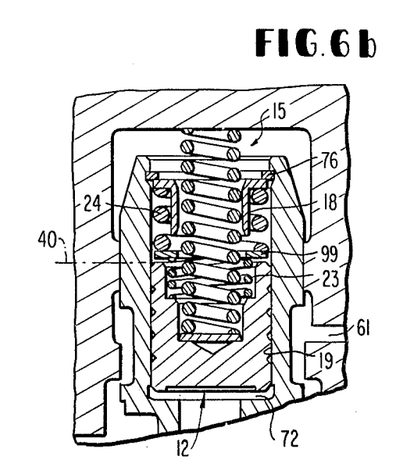
Figure 6C:
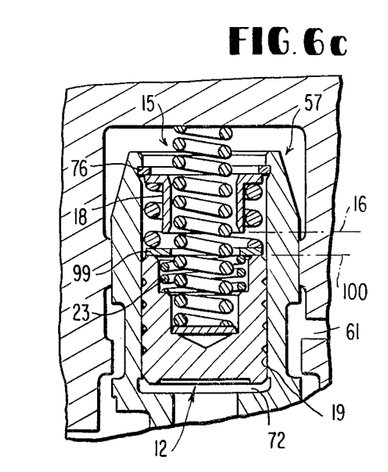
Figure 8:
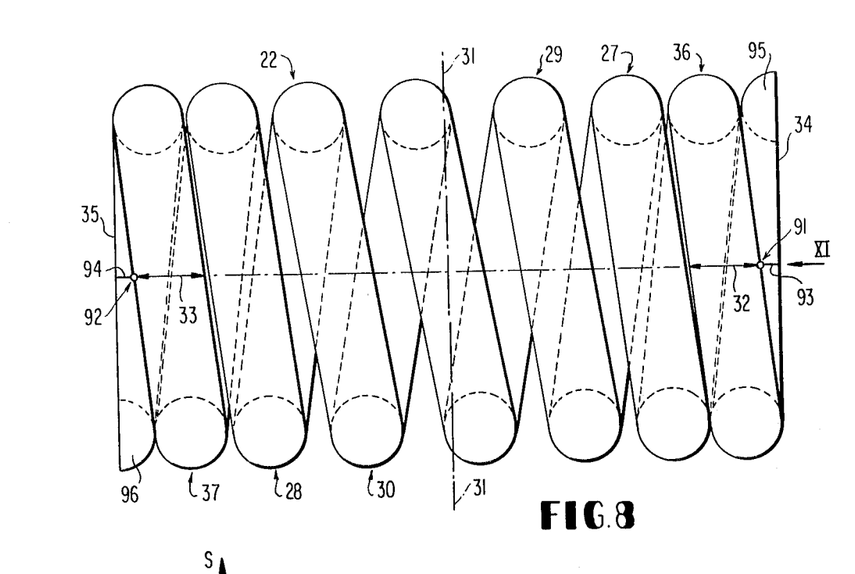
FIG. 8 is an elevational view of the reducing spring the second embodiment of FIGS. 4 and 5, illustrating certain details thereof.

In the starting position 75 of the reaction pressure piston 12 illustrated in FIG. 6a, the latter has a free stroke 14 with respect to a spring plate sleeve 18 supported at the retaining ring 76, which is composed of the two stroke sections 97 and 98 on both sides of a spring plate 99. Whereas the stronger reducing spring 24 is supported between the spring plate 99 and the spring plate sleeve 18, the weaker reducing spring 23 permits a free piston stroke 78 with respect to a corresponding abutment edge 77 of the reaction pressure piston 12, when it is supported with its other end at the spring plate 99. The reaction pressure piston 12 remains again in its starting position 75 both in the mechanical operating range of the servo-steering mechanism (curve section 81 in FIG. 7) in which the centering spring 71 retains the control arm 54 in its neutral position for the straight drive—as also in the adjoining non-reduced proportional range (curve section 83 in FIG. 7), in which the working pressure in the reaction pressure chamber 72 is smaller than the prestress of the support spring 15. If the working pressure exceeds this prestress, then the reaction pressure piston 12 passes with its abutment edge 77 into its support position 40 at the smaller reducing spring 23 corresponding to the illustration of FIG. 6b. This operation is indicated in FIG. 7 by the curve point 84. During the further increase of the working pressure, the stress of the reducing spring 23 acts opposite the stress of the support spring 15, as a result of which the hand steering moment increases to a reduced extent (curve section 85 in FIG. 7). With a further increase of the working pressure in the reaction pressure chamber 72, the reaction pressure piston 12 reaches its bridging or by-pass position 100 of FIG. 6c, in which it is supported directly at the stronger reducing spring 24 by way of the spring plate 99 in by-passing or bridging relationship to the weaker reducing spring 23. This operation is indicated in FIG. 7 by the curve point 101. During the further increase of the working pressure in the reaction pressure chamber 72, the stress of the stronger reducing spring 24 now acts opposite the stress of the support spring 15, as a result of which the manual steering moment increases with a once-further-reduced extent as a function of the steering shaft moment (curve section 102 in FIG. 7). Finally, the reaction pressure piston 12 reaches its turn-off or shut-off position indicated in FIG. 6c at 16, in which it is rigidly supported at the control slide valve member 57 by way of the spring plate sleeve 18 and the retaining ring 76. This operation corresponds in the diagram of FIG. 7 to the curve point 86. As a result thereof, the reaction pressure effect on the control slide valve member 57 is turned-off or shut-off so that the servo-steering mechanism operates with higher operating pressures in the so-called range of the manual force limitation (curve section 87 in FIG. 7).

As illustrated by the diagrams of FIGS. 5 and 7, one can achieve the desired curve configuration, on the one hand, by one or a few reducing springs with progressive spring characteristics—and on the other, by two or several reducing springs with linear spring characteristics. Finally, also the combination of reducing springs with progressive characteristics together with reducing springs with linear characteristics may be of advantage.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A servo-steering mechanism for vehicles, comprising feedback means for feeding back a load-dependent reaction moment to a hand steering wheel, the feedback means including at least one reaction pressure cylinder means operatively connected with a working pressure chamber means of the servo-steering mechanism, a reaction pressure piston means arranged in said reaction pressure cylinder means and operatively connected to the steering hand wheel, said reaction pressure piston means being operable to be actuated in one axial direction by a working pressure of the working pressure chamber means, a support spring means for supporting said reaction piston means in the other axial direction, and abutment means fixed with respect to the reaction pressure cylinder means, said reaction piston means being adapted to come into abutment with the fixed abutment means when the working pressure in the working pressure chamber means reaches a value corresponding to a prestress of the support spring means, characterized in that the abutment means is fixed on the reaction pressure cylinder means at least one reducing spring means acting in a direction opposite the working pressure is provided for additionally supporting the reaction pressure piston means between a starting position with an essentially unstressed support spring means and a shut-off position at the abutment means said reducing spring means being supported at the abutment means provided on the reaction pressure cylinder means.

2. A servo-steering mechanism according to claim 1, characterized in that the abutment means is formed by a spring ring plate mounted on the reaction pressure cylinder means.

3. A servo-steering mechanism according to claim 1, characterized in that the abutment means is formed by a spring plate sleeve.

4. A servo-steering mechanism according to claim 1, characterized in that the reducing spring means is supported directly at the abutment means.

5. A servo-steering mechanism according to claim 1, characterized in that at least one further reducing spring means is provided for supporting the first-mentioned reducing spring means on the abutment means.

6. A servo-steering mechanism according to claim 1, characterized in that the at least one reducing spring means has a progressive characteristic.

7. A servo-steering mechanism according to claim 6, characterized in that the at least one reducing spring means is formed of a plurality of cylindrical windings having a variable pitch arranged in such a manner that, during the spring deflection, more than one spring winding is stressed sequentially into mutual abutment to form a block.

8. A servo-steering mechanism according to claim 7, characterized in that the pitch is substantially symmetrical to a center plane of the at least one reducing spring means which extends perpendicular to a longitudinal axis of the spring.

9. A servo-steering mechanism according to claim 8 characterized in that the pitch of the reducing spring means is one of a sine and cosine function of the winding angle.

10. A servo-steering mechanism according to claim 9, characterized in that a start of the first spring winding beginning at a spring end of the reducing spring means is located substantially in the minimum of a pitch function.

11. A servo-steering mechanism according to claim 9, characterized in that several reducing spring means are provided and are series-connected.

12. A servo-steering mechanism according to claim 11, characterized in that at least some of said series-connected reducing spring means have different spring characteristics.

13. A servo-steering mechanism according to claim 9, characterized in that the reducing spring means is supported directly the abutment means.

14. A servo-steering mechanism according to claim 9, characterized in that at least one further reducing spring means is provided for supporting the first-mentioned reducing spring means on the abutment means.

15. A servo-steering mechanism according to claim 6, characterized in that the at least one reducing spring means is formed of a plurality of windings having a pitch which is substantially symmetrical to a center place of the reducing spring means perpendicular to a longitudinal axis of the spring.

16. A servo-steering mechanism according to claim 6, characterized in that the pitch of the at least one reducing spring means is one of a sine and cosine function of the winding angle.

17. A servo-steering mechanism according to claim 6, characterized in that a start of the first spring winding beginning at a spring end of the reducing spring means is located substantially in the minimum of a pitch function.

18. A servo-steering mechanism according to claim 1, characterized in that several reducing spring means are provided and series-connected.

19. A servo-steering mechanism according to claim 18, characterized in that said series-connected reducing spring means have different spring characteristics.

20. A servo-steering mechanism according to claim 19, characterized in that at least one of the reducing spring means has a progressive characteristic.

* * * * *